V. G. APPLE.
SPEED REDUCING GEARING.
APPLICATION FILED AUG. 10, 1917.

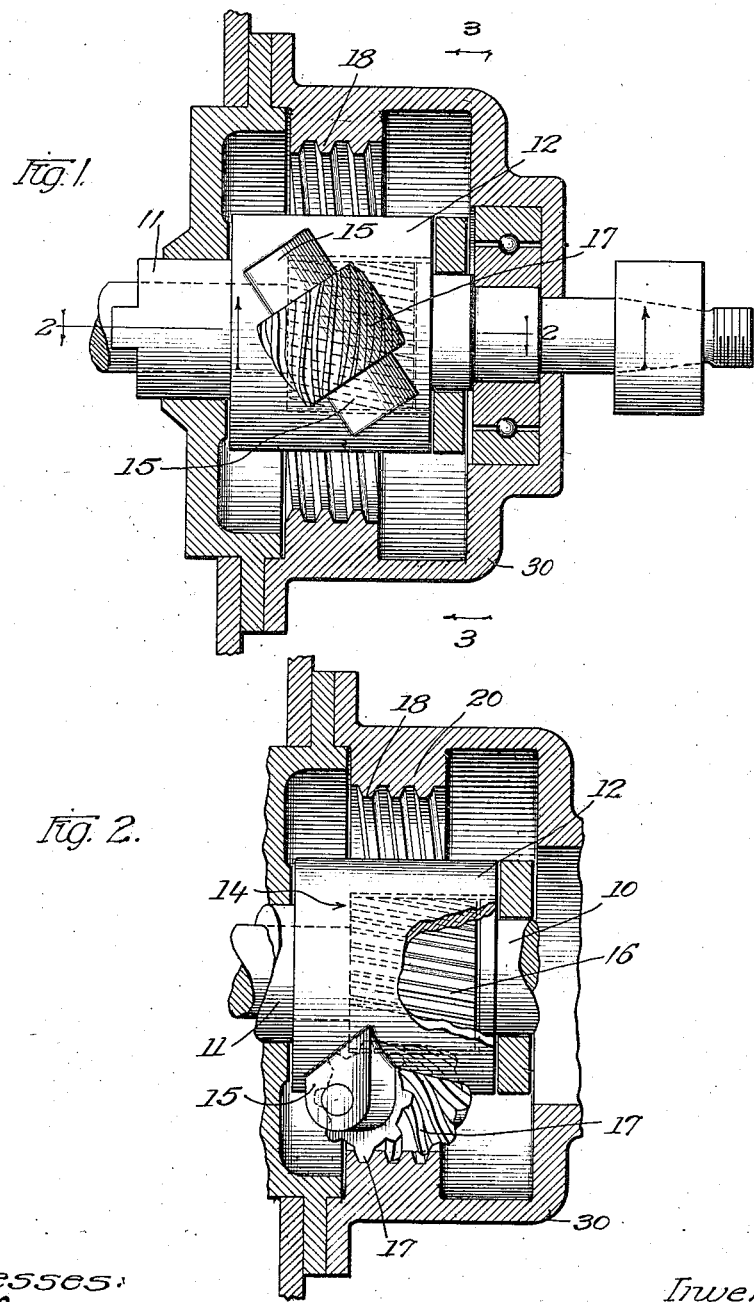

1,276,855.

Patented Aug. 27, 1918.
2 SHEETS—SHEET 2.

Witnesses:

Inventor
Vincent G. Apple
Attys.

UNITED STATES PATENT OFFICE.

VINCENT G. APPLE, OF DAYTON, OHIO.

SPEED-REDUCING GEARING.

1,276,855. Specification of Letters Patent. Patented Aug. 27, 1918.

Application filed August 10, 1917. Serial No. 185,410.

*To all whom it may concern:*

Be it known that I, VINCENT G. APPLE, a citizen of the United States, residing at Dayton, in the county of Montgomery and State of Ohio, have invented certain new and useful Improvements in Speed-Reducing Gearing, of which the following is a specification.

My invention relates to speed reducing gearing.

One of the objects of my invention is to provide a simple, silent, rugged and effective speed reducing structure, capable of being embodied in relatively small compass and having ability to effect a great difference in speed ratio between the driving and driven elements, without the employment of delicate parts and by a relatively small number of members.

Other, further and more specific objects of my invention will become readily apparent to persons skilled in the art, from a consideration of the following description when taken in conjunction with the drawings. wherein—

Figure 1 is a longitudinal axial section of the device.

Fig. 2 is a similar view showing some of the parts in somewhat different position.

In all the views the same reference characters are employed to indicate similar parts.

Figure 3:
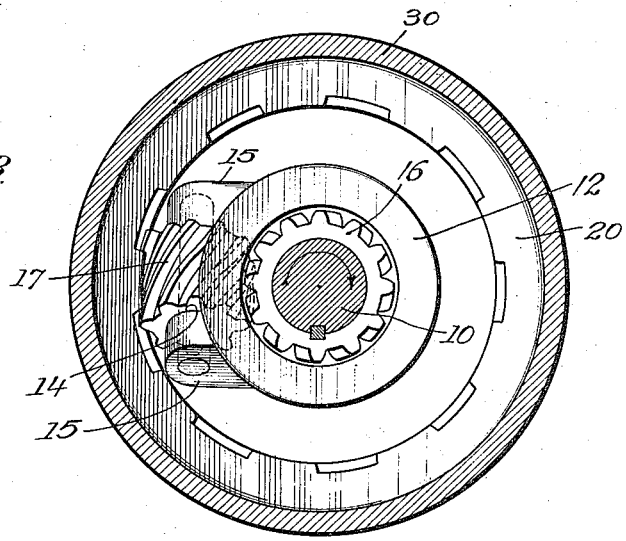
Fig. 3 is a transverse section taken on line 3—3 of Fig. 1.
Figure 4:
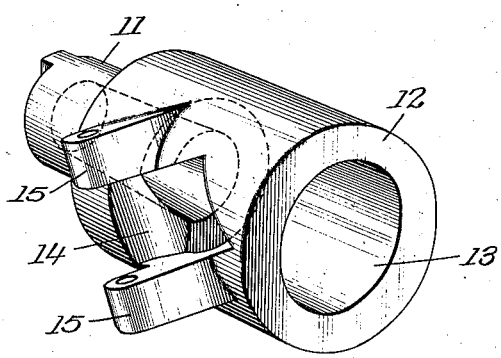
Fig. 4 is a perspective view of a rotatable pinion carrier.

My invention is for a speed reducing gearing, only, easily embodied in the frame of an electric motor, whereby to reduce the speed of a relatively high speed motor to its driving shaft or pulley.

In the drawings 10 is a shaft representing one rotatable member. 11 is a sleeve thereon representing another rotatable member. The sleeve 11 has fast thereon a pinion carrier 12, preferably a cup having an axial cavity 13 into which opens a side aperture 14 flanked by suitably disposed bearing ears 15. Within the cavity 13, of the pinion carrier the shaft 10 bears a gear 16 (called herein the "shaft" gear) with which meshes a gear 17 (called herein the "connecting" gear) that is mounted on an arbor carried in the ears 15. Gear 17 also meshes with a fixed "internal" gear 18 that surrounds the cylindrical pinion carrier and is an integral part of the casing 30. When the sleeve 11 is the driving member, the gearing communicates, in the particular exemplification shown, rotation to the shaft 10 at the rate of one turn of the shaft 10 to four turns of the sleeve 11.

The plane of the axis of connecting gear 17 (vertical to the sheet, Fig. 1) is intersected at an oblique angle by the axis of the shaft 10, the angle being preferably about 45 degrees, although different angles may be used and compensated for by appropriate spiraling of the gear teeth. The coacting teeth of the gear shaft 16 and diagonally-disposed connecting gear 17 are, preferably, so cut, spirally, that the inward teeth of the connecting gear 17 mesh with shaft gear 16 nearly axially of the shaft 10 and the outward teeth of the said connecting gear mesh with internal gear 18 nearly transversely to the axis of the shaft 10. The internal gear 18 is fixed and is preferably an integral part of the casing 30 and takes the form of an annulus having its axis parallel with the axis of the shaft 10. As a simple mechanical construction to the desired effect, this gear 18 may be cut into the cylindrical wall of the casing or it may be cut on the interior surface of a separate ring and the ring fixed to the casing.

The relative numbers of teeth on the several gears 16, 17 and 18 will determine the reduction gear ratio and for a four to one speed reduction in driven shaft 10 from the driving sleeve 11 I will assume that the shaft 16 has twelve teeth, connecting gear 17 has eight teeth and the fixed internal gear 18 has nine teeth.

In the reduction gear operation the sleeve 11 acts as the driving element. As it turns front-toward-top, Fig. 1, the carrier 12 carries bodily with it the connecting gear 17. This bodily movement of the connecting gear 17 about the axis of the shaft 10 I will, as a matter of arbitrary distinction in wording, for the purpose of clearness, call its "revolution." Rotary motion of the connecting gear 17 about its own diagonal axis I will term distinctively its "rotation." As the connecting gear 17 is "revolved" (bodily) about the shaft 16 (assumed to be stationary) its eight teeth meshing with the twelve teeth of the gear 16 tend to produce a "rotation" of the connecting gear 17 (about its own axis, front-toward-right), one and one-half times in the course of its single "revolution." In other words, were internal gear 18 removed from the device, connecting gear 17 would "rotate" one and one-half times in "revolving" once about the assumedly stationary shaft-gear 16. But considering the "revolution" of the connecting gear 17 within the internal gear 18 (assuming the latter to be stationary) it will be seen that one "revolution" must bring the eight teeth of the connecting gear 17 into coöperation with the nine teeth of the internal gear 18, so that, if the shaft-gear 16 were removed, and internal gear 18 maintained against displacement, the connecting gear 17 would "rotate," front-toward-right, one and one-eighth times per "revolution."

Now it will be apparent that with the intermediate gear 17 engaging both the shaft gear 16 and the stationary internal gear 18, as shown in the drawing, one "revolution" of the carrier cup 12 and its connecting gear 17 tends to produce a "rotation" of the gear 17 on its own axis, to the extent of twelve teeth, from the coaction of said gear 17 with the shaft gear 16 and to produce a slower rotation of the gear 17 to the extent of only nine teeth from the coaction of said gear 17 with the internal gear 18. Consequently this differentiation, or tendency of the two gears 16 and 18, is to rotate the gear 17 at different speeds, but the gear 18 is stationary and the resultant effect is to rotate the gear 16 at a speed established by the ratio of the teeth in the respective gears, as heretofore explained.

Having described my invention, what I claim is:—

1. In combination, substantially concentric non-meshing gears, with teeth disposed relatively cross-wise, one of which gears is rotatable and the other gear rotatably and axially fixed; an interposed diagonally-disposed connecting gear meshing with both said gears, means for revolving said connecting gear bodily, thereby to cause said connecting gear, in its revolution, to rotatively displace the rotative gear of the concentric gears.

2. Speed reducing gearing comprising two rotatable elements; a spur gear on one element; a fixed, internal spiral gear; a spiral-tooth connecting gear, diagonally disposed on and revoluble about the axis of the other element, said gears intermeshing and having tooth differentiation, whereby the on-its-own-axis rotation of the connecting gear, incident to its bodily revolution, rotates the driven element at a speed less than that of the driving element.

In testimony whereof I hereunto set my hand in the presence of two subscribing witnesses.

VINCENT G. APPLE.

In the presence of—
E. V. MARTIN,
CARL L. BAUMANN.